US010577979B2

(12) United States Patent
Davis et al.

(10) Patent No.: US 10,577,979 B2
(45) Date of Patent: Mar. 3, 2020

(54) OIL TANK MOUNT ARRANGEMENT ON A GEARED TURBOFAN ENGINE

(71) Applicant: UNITED TECHNOLOGIES CORPORATION, Farmington, CT (US)

(72) Inventors: Todd A. Davis, Tolland, CT (US); Mark Ronski, Tolland, CT (US); David Allen Stachowiak, Manchester, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 15/958,527

(22) Filed: Apr. 20, 2018

(65) Prior Publication Data

US 2018/0245484 A1    Aug. 30, 2018

Related U.S. Application Data

(62) Division of application No. 15/032,233, filed as application No. PCT/US2014/039296 on May 23, 2014, now Pat. No. 9,951,655.

(Continued)

(51) Int. Cl.
*F16M 11/00* (2006.01)
*F01D 25/28* (2006.01)
(Continued)

(52) U.S. Cl.
CPC ............. *F01D 25/28* (2013.01); *F01D 25/18* (2013.01); *F02C 7/06* (2013.01); *F02C 7/32* (2013.01);
(Continued)

(58) Field of Classification Search
CPC ......... F01D 25/28; F01D 25/18; F16M 13/00; F02C 7/32; F02C 7/06
See application file for complete search history.

(56) References Cited

U.S. PATENT DOCUMENTS 2,902,240 A * 9/1959 La Belle ............... B60K 15/067
248/201
4,377,933 A 3/1983 Lojou
(Continued)

OTHER PUBLICATIONS

EP Third-Party Observations for Application No. 14857461.9-1607; Dated: Dec. 5, 2017.

(Continued)

*Primary Examiner* — Amy J. Sterling
(74) *Attorney, Agent, or Firm* — Cantor Colburn LLP

(57) ABSTRACT

An oil tank mounting system for use on a structure of a turbine engine, includes three mounts with each mount configured to constrain the oil tank with a different number of degrees of freedom of movement. A first mount may have fix the oil tank in one degree of freedom, a second mount may fix the oil tank in two degrees of freedom, and a third mount may fix the oil tank in three degrees of freedom. This allows limited rotational and expansion movement while coupling the oil tank to the engine. The mount attachments may be embodied in rubber, with pins, or with spherical joints in a variety of configurations. Frangible pins may be used to absorb energy but still retain the oil tank in the event of a high energy event.

16 Claims, 6 Drawing Sheets

Related U.S. Application Data

(60) Provisional application No. 61/897,020, filed on Oct. 29, 2013.

(51) Int. Cl.
  *F02C 7/06* (2006.01)
  *F02C 7/32* (2006.01)
  *F01D 25/18* (2006.01)
  *F16M 13/02* (2006.01)

(52) U.S. Cl.
  CPC ......... *F16M 13/02* (2013.01); *F05D 2220/32* (2013.01); *F05D 2230/60* (2013.01); *F05D 2250/41* (2013.01); *F05D 2250/411* (2013.01); *F05D 2250/42* (2013.01); *F05D 2250/43* (2013.01); *F05D 2260/30* (2013.01)

(56) References Cited

U.S. PATENT DOCUMENTS

| | | | |
|---|---|---|---|
| 6,357,220 | B1 | 3/2002 | Snyder et al. |
| 6,935,591 | B2 | 8/2005 | Udall |
| 7,040,661 | B2 * | 5/2006 | Choi ................... B60K 15/067 280/834 |
| 2002/0079630 | A1 | 6/2002 | Bachmeyer et al. |
| 2006/0038066 | A1 | 2/2006 | Udall et al. |
| 2007/0125087 | A1 | 6/2007 | Callaghan |
| 2008/0115454 | A1 | 5/2008 | Xie |
| 2009/0317229 | A1 | 12/2009 | Suciu et al. |
| 2011/0139925 | A1 | 6/2011 | Lisiewicz et al. |
| 2011/0239660 | A1 | 10/2011 | Suciu et al. |
| 2011/0296847 | A1 | 12/2011 | Williams |
| 2013/0042630 | A1 | 2/2013 | Muldoon |
| 2014/0326842 | A1 * | 11/2014 | Leonard ................... F02C 7/32 248/205.1 |
| 2016/0273389 | A1 | 9/2016 | Davis et al. |

OTHER PUBLICATIONS

European Search Report for EP Application No. 14 85 7461.
International Search Report for International application No. PCT/US2014/039296; International filing date: May 23, 2014; dated Oct. 21, 2014; 3 pgs.
International Written Opinion for International application No. PCT/US2014/039296; International filing date: May 23, 2014; dated Oct. 21, 2014; 4 pgs.
European Search Report dated Oct. 9, 2019 for Application No. 19175223.7.

* cited by examiner

OIL TANK MOUNT ARRANGEMENT ON A GEARED TURBOFAN ENGINE

CROSS REFERENCE TO RELATED APPLICATIONS

This application is a divisional of U.S. patent application Ser. No. 15/032,233 filed on Apr. 26, 2016, which is U.S. National Stage Application of PCT Application No. PCT/US2014/039296 filed on May 23, 2014, which claims the benefit of U.S. Provisional Patent Application No. 61/897,020 filed on Oct. 29, 2013, the contents each of which are incorporated herein by reference thereto.

FIELD OF THE DISCLOSURE

The subject matter of the present disclosure generally relates to gas turbine engines and more particularly, to mounting an oil tank on a geared turbofan engine.

BACKGROUND OF THE DISCLOSURE

It is desirable to mount an oil tank of a gas turbine engine on the fan case. This puts the oil tank forward of the high-heat areas of the engine and provides some level of ambient air cooling. It is also more easily reached for service and maintenance while freeing very limited mechanical space aft of the fan case. However, geared turbofan engines are characterized by large fan diameters that have driven fan cases to an increasing use of composites over traditional aluminum and other metals and alloys. Mounting the oil tank to the fan case is more difficult with a composite because of different coefficients of expansion between the tank and the fan case and the different profiles for deflection and loading under normal, limit, and ultimate scenarios.

SUMMARY OF THE DISCLOSURE

In a first embodiment, a mounting system for mounting an oil tank on a structure of a gas turbine engine includes a first mount coupled between the oil tank and a first point on the structure. The first mount may be configured to fix the oil tank along one degree of freedom. The mounting system may also include a second mount coupled between the oil tank and a second point on the structure. The second mount may be configured to fix the oil tank along two degrees of freedom. In addition, the mounting system may include a third mount coupled between the oil tank and a third point on the structure. The third mount may be configured to fix the oil tank along three degrees of freedom.

In another embodiment, a method of supporting an oil tank on a structure of a gas turbine engine includes attaching a first support between the oil tank and the structure. The first support may constrain the oil tank in one degree of freedom. The method may include attaching a second support between the oil tank and the structure. The second support may constrain the oil tank in two degrees of freedom. The method may also include attaching a third support between the oil tank and the structure. The third support may constrain the oil tank in three degrees of freedom.

In yet another embodiment, a system for mounting an oil tank to a fan case of a gas turbine engine may include a tripod mount coupled between a leading side portion of the oil tank and a leading end component of the fan case. The system may also include a triangle mount coupled between a trailing side portion of the oil tank and the fan case. The system may further include a single link mount coupled between another trailing side portion of the oil tank and the fan case.

BRIEF DESCRIPTION OF THE DRAWINGS

So that the manner in which the above recited concepts of the present disclosure may be understood in detail, a more particular description is provided by reference to the embodiments which are illustrated in the accompanying drawings. It is to be noted, however, that the appended drawings illustrate only typical embodiments and are therefore not to be considered limiting of its scope, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION

In an embodiment, mounts with limited degrees of freedom are used to allow movement of an oil tank attached to a fan case of an engine, while still completely constraining the oil tank. In addition, with the use of composite or other special materials in air frames, structures, and engine cases, issues including, thermal expansion, vibration, twist, etc., are more severe than in other gas turbine engines, for example, those using all metal or metal alloy fan cases.

Figure 1:
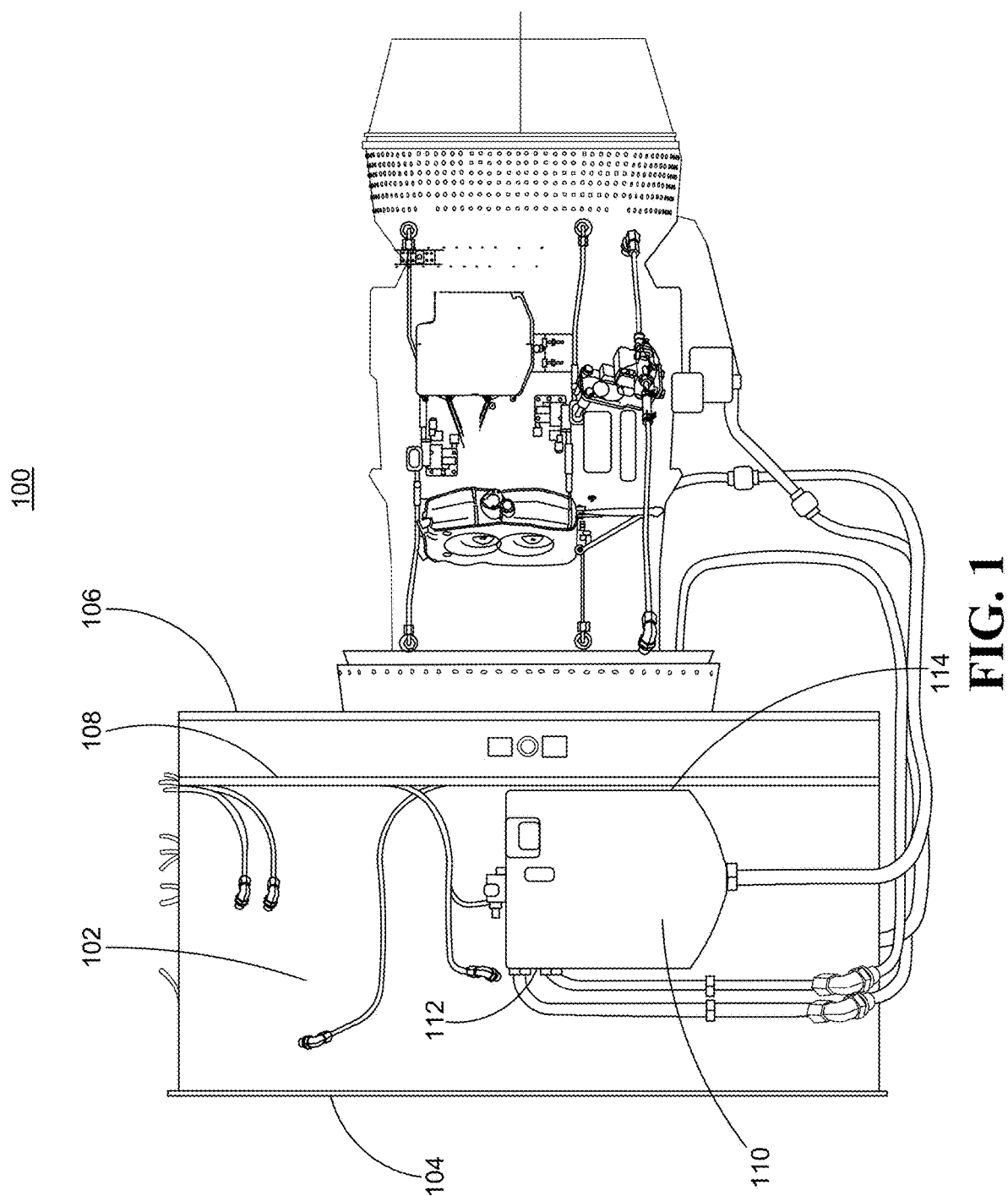
FIG. 1 illustrates a view of a gas turbine engine showing an oil tank mounted to a fan case, according to an embodiment.

Referring to FIG. 1, an engine 100, for example, a geared turbofan engine, may include a fan case 102 having a front 104 and a back 106 and may include a radial structure known as a B flange 108. Also illustrated on the engine 100 in this embodiment is an oil tank 110 with a leading side 112 and a trailing side 114. The leading side 112 and the trailing side 114 are used with respect to their position on the engine 100, and may for the purposes of this disclosure may include surfaces adjacent to the actual sidewalls of the oil tank 110 when discussing mounting points for various brackets and mounts. The oil tank 110 may be held on with mounts shown in more detail in the following illustrations. In an embodiment, the oil tank 110 is aluminum with a coefficient of expansion of approximately 10 micro-inches/inch/° F. However, when manufactured using a composite, the fan case 102 may have a coefficient of expansion that is virtually zero, or even slightly negative. Therefore, in an embodiment, the oil tank 110 may grow as much as a sixteenth of an inch front-to-back (axially along the fan case 102) and a non-negligible amount top-to-bottom (radially along the fan case).

Using a system of mounts that does not attempt to prevent movement but still constrains the case to its location allows the oil tank 110 to grow and contract while still being held in place. Each physical body has six degrees of freedom with respect to another body, translation in the x, y, and z directions, and rotation about the x, y, and z axes. A body may be constrained in one or more degrees of freedom, for example, hinges between a door and door frame restricts the door to rotational movement in one axis but allows translation in the x and y directions.

The system of mounts described below, in various embodiments, attach the oil tank 110 to a structure, such as the fan case 102, and constrain the oil tank 110 in one degree of freedom at one mount, two degrees of freedom at a second mount, and three degrees of freedom at a third mount. The result is that the oil tank 110, or any body so attached, will have some limited movement, but will be secured in place relative to the other body. While in the following exemplary embodiments discuss mounting the oil tank 110 with respect to various physical features of the fan case 102, it should be understood that the mounting system disclosed is suitable for use in coupling any two structures to each other, particularly in situations where a first structure has a different coefficient of expansion from the other structure.

Figure 2:
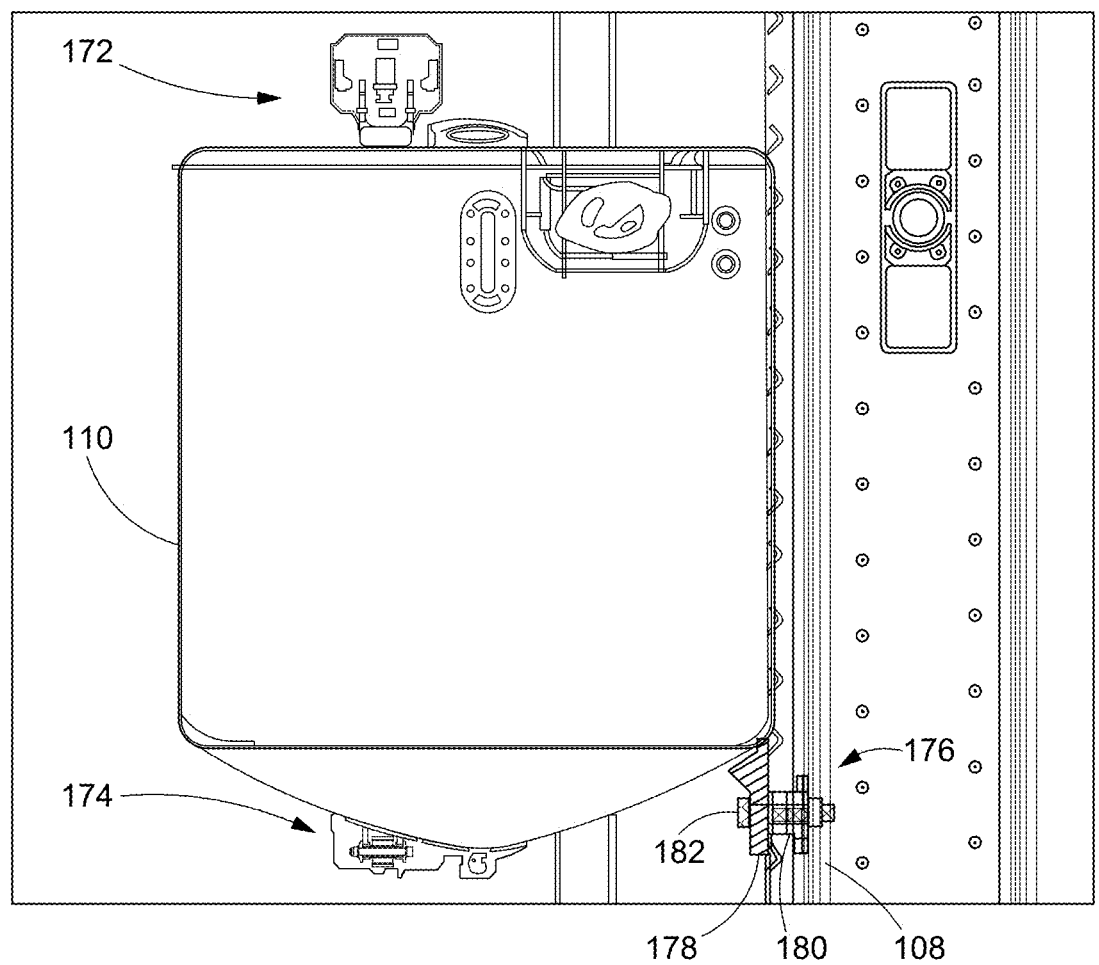
FIG. 2 is a simplified illustration of a first mounting technique for the oil tank of FIG. 1, according to an embodiment.

FIG. 2 is a simplified illustration of a mounting apparatus for the oil tank of FIG. 1. The mounting technique may use a first mount 172, a second mount 174, and a third mount 176. The mounting technique is discussed in more detail below with respect to FIGS. 3-5.

Figure 3:
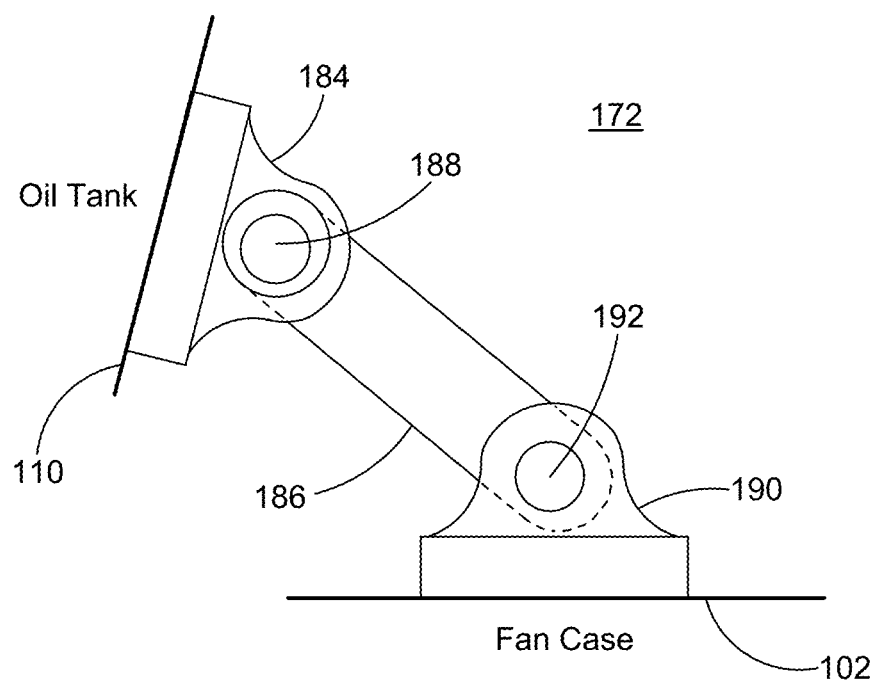
FIG. 3 is a side view illustration of one mount of the mounting technique shown in FIG. 2, according to an embodiment.

Turning to FIG. 3, the first mount 172 of FIG. 2 is shown in side view, according to an embodiment. A bracket 184 is shown mounted to a wall of the oil tank 110. Another bracket 190 is shown mounted to an outer surface of the fan case 102. A linkage 186 may be connected to the bracket 184 and bracket 190 via pin 188 and pin 192. The linkage 186 allows radial rotation, radial translation, and vertical translation of the oil tank 110 with respect to the fan case 102. Because of the elongate shape and mounting holes on each end, the linkage 186 is sometimes referred to as a dogbone link. However, the oil tank 110 is constrained from side-to-side translation (i.e., axial translation) with respect to the fan case 102. The bracket 184 and the bracket 190 may be attached by any of a number of known means, including, but not limited to, fasteners, welds, or molded into or glued onto respective the composite surfaces, sometimes called "bathtub mounts," which may include threaded metal plates.

Figure 4:
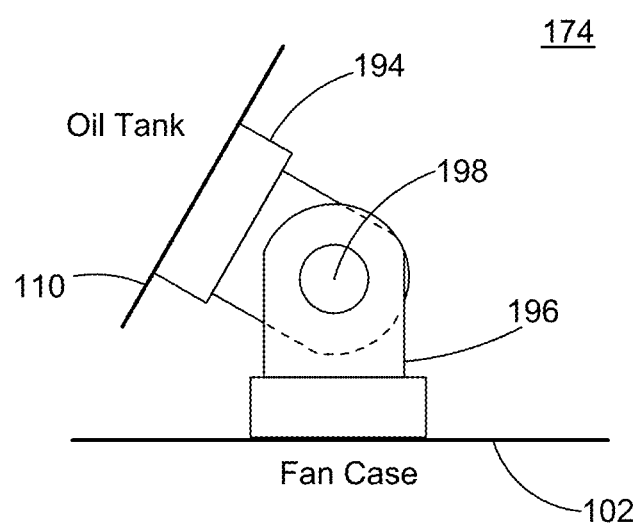
FIG. 4 is a side view illustration of another mount of the mounting technique shown in FIG. 2, according to an embodiment.

FIG. 4, shows the second mount 174 of FIG. 2 in side view, according to an embodiment. A bracket 194 may be mounted to a wall of the oil tank 110 and coupled to a bracket 196 by a pin 198. The bracket 196 may be coupled to the outer surface of the fan case 102. As above, the brackets 194 and 196 may be attached by any of a number of known means, including, but not limited to, fasteners, welds, or molded into or glued onto respective the composite surfaces, sometimes called "bathtub mounts," which may include threaded metal plates. The second mount 174 may allow only rotational movement of the oil tank 110 with respect to the fan case 102 and may be constrained in two degrees of freedom both axial and radial.

Figure 5:
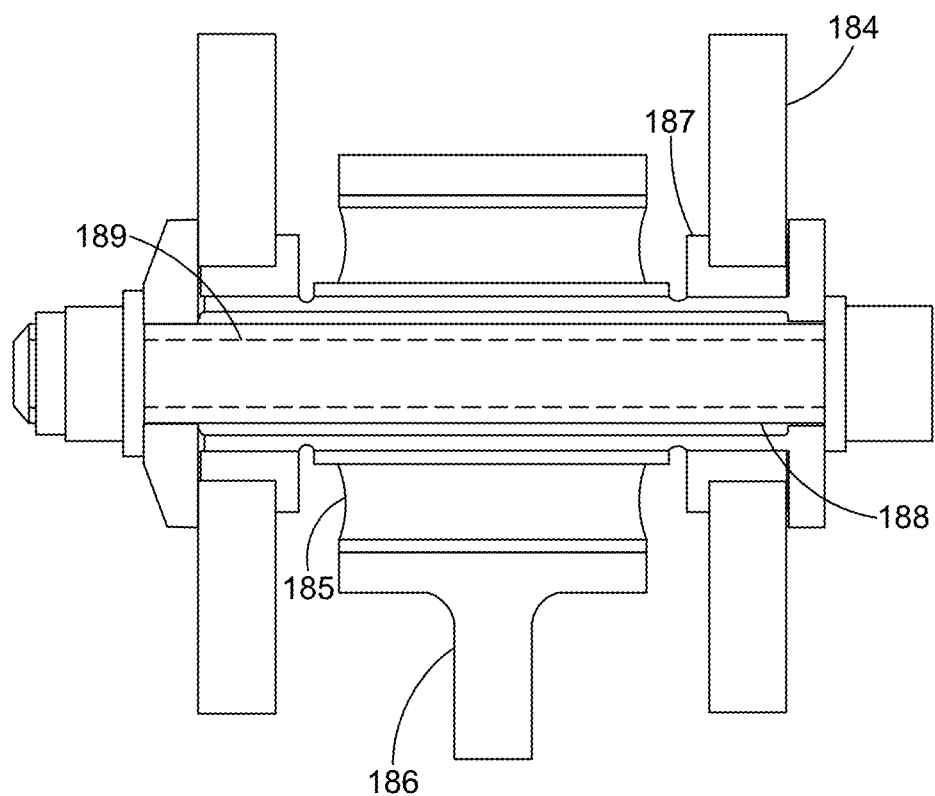
FIG. 5 is a cutaway view of a mount, according to an embodiment.

FIG. 5 illustrates in more detail an embodiment of the oil-tank end of the first mount 172 of FIG. 3 and more generally, also illustrates an embodiment of the connections used at brackets 190 and 196. The bracket 184 on the oil tank 110 may be connected to the linkage 186 by a pin 188. A bushing 187 may be used to prevent wear on the lugs of the bracket 184. A rubber gasket 185 may be used to cushion the contact point between the linkage 186 and pin 188. The rubber gasket 185 may provide wear protection and add a level of shock absorption to the assembly. In an embodiment, the pin 188, as well as pins 192 and 198 of FIGS. 3 and 4 may be frangible pins. That is, they may break during some failure modes and allow energy to be absorbed by the act of breaking the pins and by the extended movement of the oil tank 110 with respect to the fan case 102. In an additional embodiment, a secondary shaft 189 associated with each pin may remain, in a known manner, to keep the oil tank 110 coupled to the engine 100 after the release of energy associated with breaking the pin and the additional movement available to the oil tank 110.

Returning to FIG. 2, the third mount 176 may include a bracket 178 attached to the oil tank 110 and a mount 180 attached to the B flange 108 by a bolt or fastener 182. The third mount 176 allows rotational movement of the oil tank 110 around the axis of the bolt or fastener 182 but is constrained in three degrees of freedom, that is axial, radial, and height above the fan case 102.

Figure 6B:
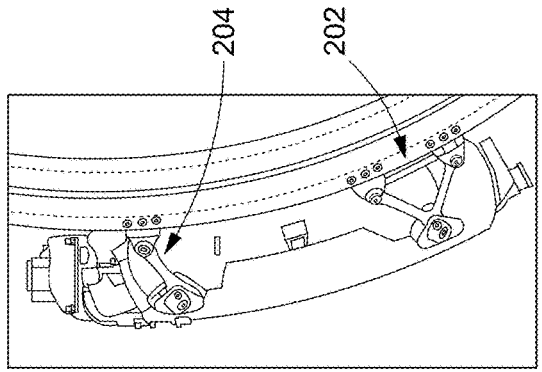
FIGS. 6a, 6b, and 6c are front, side, and bottom views, respectively, of a second mounting technique for the oil tank of FIG. 1, according to an embodiment.
Figure 6A:
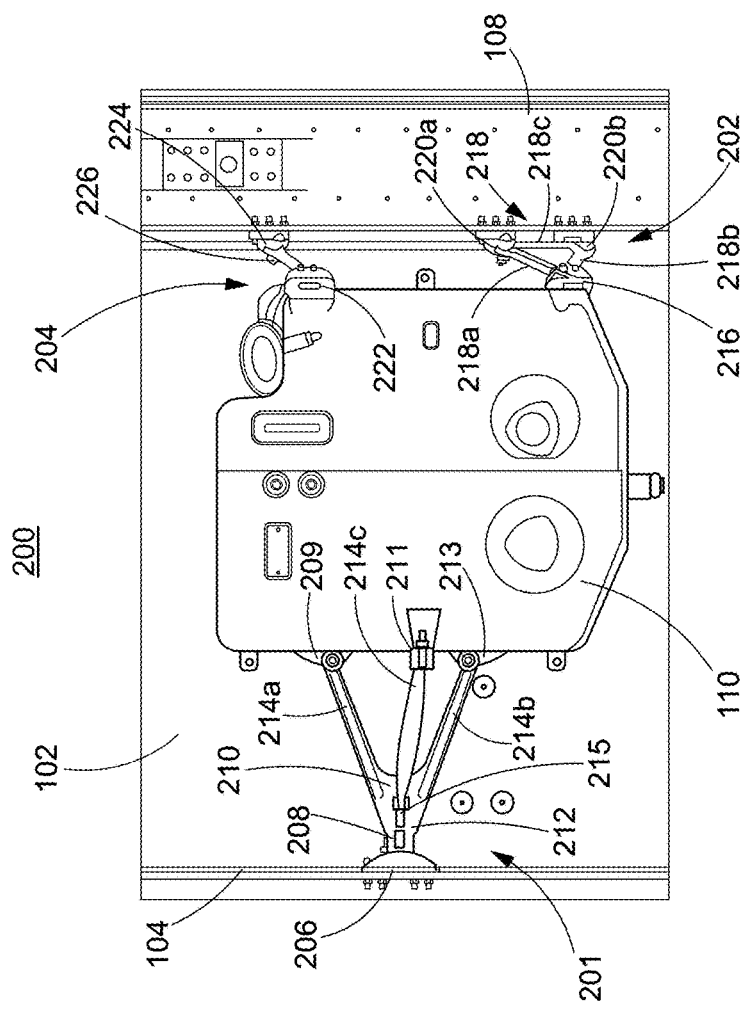
Figure 6C:
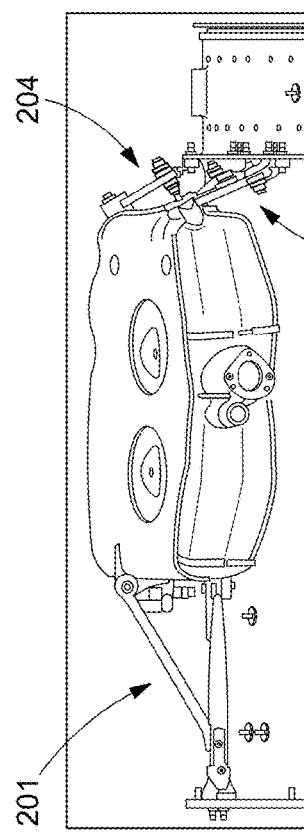

FIGS. 6a, 6b, and 6c are simplified illustrations of a second mounting technique for the oil tank 110 of FIG. 1, according to various embodiments. FIGS. 6a-6c illustrate various perspectives of a mount system with mounts only from the front 104 of the fan case 102 and the B flange 108, leaving the face of the fan case 102 clear. This avoids the need to provide the bathtub mounts on the face of the fan case 102 shown in the exemplary embodiment of FIG. 2. According to an embodiment, three mounts are used, a first mount 201, a second mount 202, and a third mount 204.

The first mount 201 may have a mounting bracket 206 coupled to the front 104 of the fan case 102. The mounting bracket 206 may be coupled to a base of a spherical joint 208 that is coupled at a free end to a tripod 210. A head 212 of the tripod 210 may be coupled to the second side of the spherical joint 208 and the head 212 may be attached to the two of the three tripod legs 214a and 214b. The third tripod leg 214c is connected to the head 212 by another spherical joint 215. A base end of each of the tripod legs 214a, 214b, and 214c may be coupled to separate points on the oil tank 110. Each base end may also include a spherical joint attachment. In an embodiment, the first mount 201, allows no translation of the oil tank 110, but the arms of the tripod 210 can pivot as the oil tank 110 expands and contracts. The oil tank 110 is constrained in three degrees of freedom along the plane of the base triangle of the mount. That is, a leading side of the oil tank at the point of attachment to the tripod 210, cannot move radially, axially, or in height above the fan case, but still allows the depth of the oil tank to change and allows limited rotation of the oil tank with respect to the leading edge 104.

The second mount 202 may include a spherical joint 216 with a base coupled to the oil tank 110 directly or via a bracket. Two legs 218a and 218b of a triangle support 218 may be coupled to the free end of the spherical joint 216 and to separate B flange mounts 220a and 220b, respectively. In an embodiment, each B flange mount 220a and 220b may also include spherical joints. A third leg 218c of the triangle support 218 may be coupled between the B flange mounts 220a and 220b. In an embodiment, the third leg 218c of the triangle support 218 may be accommodated by the B flange 108 itself without a separate third leg 218c. The second mount 202 may constrain the oil tank in two degrees of freedom in that a trailing side of the oil tank 110 may move axially closer to and farther from the B flange as the oil tank 110 expands and contracts, but the attachment point of the spherical joint 216 is restricted in the radial direction and height.

The third mount 204 may include, as above, a spherical joint 222 mounted or coupled to the oil tank 110. A free end of the spherical joint 222 coupled by a rod or shaft 226 to a bracket 224 mounted on the B flange. The bracket 224 may also include a spherical joint. The third mount 204 is constrained in one degree of freedom and allows movement of the oil tank 110 both axially with respect to the B flange 108 and radially toward and away from the second mount 202.

With reference to FIGS. 6a, 6b, and 6c, each of the three mounts can be described in terms of the motion that the mount allows and restricts with respect to its end points.

In an embodiment, the second mount 202 fixes the distance between the spherical mount 216 and each of the B-flange mounts 220a and 220b and keeps the spherical mount 216 a relatively fixed distance above the fan case 102. The clearance distance between the fan case 102 and a bottom surface of the oil tank 110 may vary as the oil tank expands and contracts in use. The triangular support 218 also fixes the radial relationship between the spherical mount 216 and the two B-flange mounts 220a and 220b so that, in the embodiment, the spherical mount 216 is fixed radially with respect to the fan case 110. However, the nature of the spherical mounts allows axial movement (toward and away from the front 104 of fan case 102) of the spherical mount 216 with respect to the B-flange mounts 220a and 220b as the oil tank 110 expands and contracts in width. In this embodiment, the axial movement of the oil tank causes rotation of the triangular support 218 about an axis defined by the third leg 218c.

The third mount 204 allows both radial motion and axial motion between the base spherical joint 224 and the oil tank spherical mount 222. The third mount 204 constrains the distance between the base spherical joint 224 and the oil tank spherical mount 222 at a fixed length equal to a length of the rod or shaft 226. Expansion and contraction of the oil tank 110 causes both axial and radial movement of the spherical mount 222.

Because both the second mount 202 and the third mount 204 are placed at an acute angle with respect to the oil tank 110 and the fan case 102, expansion of the tank in the axial direction will cause the oil tank 100 to rise slightly as the respective mounts become more vertical. This slight rise may help to accommodate any increase in depth of the oil tank 110.

The first mount 201 may constrain a leading edge of the oil tank 110 both axially and radially. The leg 214c, due to the spherical mounts at both ends, allows the oil tank 110 to expand in depth while still contributing to the axial and radial constraint of the leading edge of the oil tank 110.

In an embodiment, if the axial direction is defined as the horizontal, the radial direction is defined as the vertical, and a distance from a face of the fan case is defined as height, a first mount constrains one point on the oil tank in both the horizontal and vertical, a second mount constrains the tank in the vertical, and the third mount allows motion in both the horizontal and vertical. Each of the mounts contributes to constraining the height of the oil tank 110 above the fan case 102.

As would be understood by one of ordinary skill in the art, any of the mounts described herein may be made of steel, composite material, or other suitable high strength materials, or a combination thereof.

Figure 7:
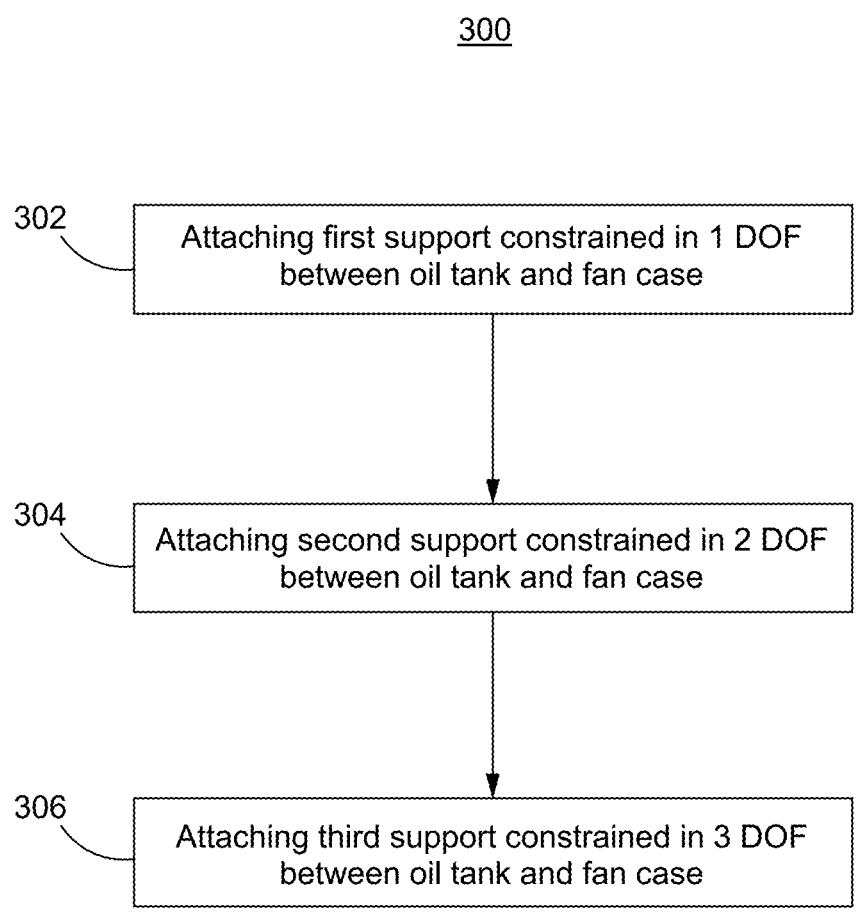
FIG. 7 is a process flow for mounting an oil tank to a fan case in a gas turbine engine, according to an embodiment.

FIG. 7 illustrates a method 300 of attaching an oil tank 110 to a fan case 102 in an engine 100, such as a gas turbine engine. At a block 302, a first support may be attached between the oil tank 110 and the fan case 102. The first support may constrain the oil tank in three degrees of freedom as discussed above with respect to mounts 172 of FIG. 2, and 201 of FIG. 6a.

At a block 304, a second support may be attached between the oil tank 110 and the fan case 102 wherein the second support constrains the oil tank 110 in two degrees of freedom. The second support may include embodiments described above with respect to mounts 174 of FIG. 2, and 202 of FIG. 6a.

At a block 306, a third support may be attached between the oil tank 110 and the fan case 102. The third support may constrain the oil tank in three degrees of freedom so that in combination with the first support and the second support, the oil tank is fully captured but is not immovably attached to the fan case. The third support may include embodiments described above with respect to mounts 176 of FIG. 2 and 204 of FIG. 6a. Although certain embodiments of the oil tank mounting system are described above, other mechanical attachments that preserve the concept of increasing constraints to allow secure mounting without rigid attachment are possible.

Applications

In each of the above designs, by constraining the oil tank 110 at three points with one, two, and three degrees of freedom constrained, respectively at each point, the oil tank is fully captured, but still moveable to accommodate changes due to pressure, thermal expansion, vibration, etc. The system and methods discussed above are relevant to applications on geared turbofan engines where large fan case diameters and the use of composite materials makes traditional oil tank mounting problematic. The use of these techniques to allow continued mounting of the oil tank on the fan case or other structure in the face of these problems retains the benefits of space utilization, maintenance access, and cooling enabled by this forward mounting position.

While the present disclosure has shown and described details of exemplary embodiments, it will be understood by one skilled in the art that various changes in detail may be effected therein without departing from the spirit and scope of the disclosure as defined by claims that may be supported by the written description and drawings. Further, where these exemplary embodiments (and other related derivations) are described with reference to a certain number of elements it will be understood that other exemplary embodiments may be practiced utilizing either less than or more than the certain number of elements.

What is claimed is:

1. A mounting system for mounting an oil tank on a structure of a gas turbine engine, the mounting system comprising:
    a first mount comprising a tripod coupled between the oil tank and a first point on the structure, the first mount configured to fix the oil tank along one degree of freedom;
    a second mount coupled between the oil tank and a second point on the structure, the second mount configured to fix the oil tank along two degrees of freedom; and a third mount coupled between the oil tank and a third point on the structure, the third mount configured to fix the oil tank along three degrees of freedom.

2. The mounting system of claim 1, wherein the structure is a fan case and the third mount is configured to be fixed to a B flange of the fan case.

3. The mounting system of claim 1, wherein:
the first mount includes a link with first end bore at one end of the link and second end bore at an opposite end of the link, with a rubber bushing disposed in each end bore, a first pin placed through the first end bore and a first rubber bushing and directly coupled to a bracket configured to be fixed to the structure and a second pin rotatably disposed through the second end bore and a second rubber bushing, the second pin directly coupled to a bracket configured to be mounted to the oil tank.

4. The mounting system of claim 3, wherein:
the second mount includes a first bracket configured to be coupled to the oil tank and a second bracket configured to be coupled to the structure, the bracket including a rubber bushing disposed in a bore of the bracket and a pin rotatably disposed through the rubber bushing.

5. The mounting system of claim 4, wherein:
the third mount includes a bracket configured to be attached to the oil tank and a rubber mount configured to be attached to the structure, the bracket fixedly attached to the rubber mount.

6. The mounting system of claim 1, wherein the first mount includes a linkage with bores on each end, a first bore on a first linkage end of the linkage coupled via a pin to a first bracket configured to be attached to the structure and a second bore on a second end coupled via a second pin to an oil tank bracket configured to be attached to the oil tank.

7. The mounting system of claim 6, wherein the second mount includes a second bracket configured to be attached to the structure, the second bracket hingedly coupled via a third pin to a second oil tank bracket that is configured to be attached to the oil tank.

8. The mounting system of claim 7, wherein the third mount includes a bracket configured to be attached to the oil tank and configured to be bolted to an attachment point on the structure.

9. The mounting system of claim 7, wherein the first pin, second pin, and third pins are frangible pins.

10. The mounting system of claim 1, wherein the structure is a fan case and the first mount includes a bracket configured to be coupled to a leading edge of the fan case and to a first side of a spherical joint, an opposite side of the spherical joint coupled to a head of the tripod, wherein each leg of the tripod is configured to be separately coupled to different points on the oil tank.

11. The mounting system of claim 10, wherein the second mount includes a triangle coupler with both ends of a base leg of the triangle coupler configured to be coupled to the fan case via separate spherical mounts and a head end of the triangle coupler configured to be coupled to the oil tank via another spherical mount.

12. The mounting system of claim 11, wherein the third mount is a dogbone link with a first end configured to be coupled via a pin to the oil tank and a second end configured to be coupled via another pin to the fan case.

13. The mounting system of claim 1, wherein at least two of the first point, the second point, and the third point are at opposite ends of the oil tank.

14. A system for mounting an oil tank to a fan case of a gas turbine engine, the system comprising:
a tripod mount coupled between a leading side portion of the oil tank and a leading end component of the fan case;
a triangle mount coupled between a trailing side portion of the oil tank and the fan case; and
a single link mount coupled between another trailing side portion of the oil tank and the fan case.

15. The system of claim 14, wherein the tripod mount comprises a tripod with each leg of the tripod coupled to the leading side portion of the oil tank, a head of the tripod coupled to a proximal end of a spherical joint, and a bracket coupled to the leading end component of the fan case coupled to a distal end of the spherical joint.

16. The system of claim 15, wherein the tripod is made of steel.

* * * * *